(12) United States Patent
Hamilton et al.

(10) Patent No.: US 6,697,848 B2
(45) Date of Patent: *Feb. 24, 2004

(54) METHOD AND APPARATUS FOR ENABLING APPLICATION PROGRAMS TO COMMUNICATE WITH NETWORK CLIENTS AND SERVERS

(75) Inventors: Graham Hamilton, Palo Alto, CA (US); Peter B. Kessler, Palo Alto, CA (US); Jeffrey Donald Nisewanger, San Jose, CA (US); Sami Shaio, San Francisco, CA (US); Jacob Y. Levy, Los Altos, CA (US); Steven Robert Kleiman, Los Altos, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/395,920

(22) Filed: Sep. 14, 1999

(65) Prior Publication Data

US 2003/0065750 A1 Apr. 3, 2003

Related U.S. Application Data

(63) Continuation of application No. 08/543,674, filed on Oct. 16, 1995, now Pat. No. 6,009,464.
(60) Provisional application No. 60/004,057, filed on Sep. 20, 1995.

(51) Int. Cl.⁷ .............................................. G06F 15/16
(52) U.S. Cl. ...................................... 709/219; 709/230
(58) Field of Search ................................. 709/220, 221, 709/222, 229, 219, 230; 704/235

(56) References Cited

U.S. PATENT DOCUMENTS

| | | | | |
|---|---|---|---|---|
| 5,475,817 A | * | 12/1995 | Waldo et al. | 709/303 |
| 5,481,721 A | * | 1/1996 | Serlet et al. | 709/303 |
| 5,511,197 A | * | 4/1996 | Hill et al. | 709/303 |

(List continued on next page.)

FOREIGN PATENT DOCUMENTS

EP  0 463 764 A2 * 1/1992

OTHER PUBLICATIONS

Graham Hamilton et al., Subcontract: A Flexible Base for Distributed Programming, Proc of 14th ACM Symposium of Op Sys Prin, pp. 69–76, 1993.*
Peter B. Kessler, A Client–Side Stub Interpreter, ACM SIG PLAN Notices, vol. 29, No. 8, pp. 94–100, 1994.*
T. Berners–Lee et al., RFC 1738: Uniform Resource Locators (URL), Network Working Group, Dec. 1994.*
Ken North, Understanding OLE, DBMS Online, www.dbsmag.com, Jun. 1995, 11 pages.*
Don Anderson, Helper Applications for the Web, www–step.ucsd.edu/, Aug. 1995, 7 pages.*

*Primary Examiner*—Patrice Winder
(74) *Attorney, Agent, or Firm*—Townsend and Townsend and Crew LLP

(57) ABSTRACT

A method for enabling an application program to communicate with a network server, includes the steps of downloading a document from a document server to the application program, downloading code from a code server associated with the document server to the application program, the code including a network protocol handler for the network server, and using the network protocol handler to communicate with the network server.

60 Claims, 11 Drawing Sheets

Microfiche Appendix Included
(1 Microfiche, 46 Pages)

U.S. PATENT DOCUMENTS

| | | | | |
|---|---|---|---|---|
| 5,515,508 A | * | 5/1996 | Pettus et al. | 709/203 |
| 5,530,852 A | * | 6/1996 | Meske, Jr. et al. | 709/206 |
| 5,546,584 A | * | 8/1996 | Lundin et al. | 709/303 |
| 5,577,251 A | * | 11/1996 | Hamilton et al. | 709/203 |
| 5,630,066 A | * | 5/1997 | Gosling | 709/221 |
| 5,682,325 A | * | 10/1997 | Lightfoot et al. | 709/229 |
| 5,737,607 A | * | 4/1998 | Hamilton et al. | 395/701 |
| 5,742,845 A | * | 4/1998 | Wagner | 710/11 |
| 5,758,186 A | * | 5/1998 | Hamilton et al. | 710/11 |
| 5,890,123 A | * | 3/1999 | Brown et al. | 704/235 |

* cited by examiner

```
                      Netscope
File  Edit  View  Go  Bookmarks  Options  Directory                    Help
 ⇦     ⇨    🏠    ↻    📇    📇    🖨    🔍      🛑
Back Forward Home Reload Images Open Print Find     Stop
Netsite: file://localhost/export/JOE stock.html                         N
What's New! What's Cool! Handbook | Net Search | Net Directory | Newsgroup Symbol:      SUNW
        Description: Sun Microsystems, Inc.
        Exchange:    NASDAQ
        Last:        62.6250
        Bid:         62.5000
        Ask:         62.7500
        Volume:      200,000
        Yearly High: 62.6250
        Yearly Low:  29.8750

Number of Shares:   | 500     |

Price:              | 62.6250 |

Buy or Sell:        | - BUY   |

Notify when executed: | YES   |

| SUBMIT |  ─ 1340

□□ Document Done
```

FIG. 14

METHOD AND APPARATUS FOR ENABLING APPLICATION PROGRAMS TO COMMUNICATE WITH NETWORK CLIENTS AND SERVERS

This application is a continuation of and claims the benefit of U.S. application Ser. No. 08/543,674 filed Oct. 16, 1995, now U.S. Pat. No. 6,009,464 which is a continuation of Ser. No. 60/004,057 filed Sep. 20, 1995, now abandoned, the disclosures of which are incorporated by reference.

TRADEMARK NOTICE

Sun, Spring, Solaris, Sunsoft, SunOS, Java and HotJava are trademarks or registered trademarks of Sun Microsystems, Inc. in the United States and other countries. All SPARC trademarks are used under license and are trademarks or registered trademarks of SPARC International, Inc. in the United States of America and other countries. Products bearing SPARC trademarks are based upon an architecture developed by Sun Microsystems, Inc.

BACKGROUND OF THE INVENTION

The present invention relates generally to distributed object-oriented programming, and more specifically to interoperability of distributed objects between network clients and network servers.

In the present disclosure the term "network server" refers to an apparatus on a network that includes software objects, and the term "network client" refers to an apparatus on a network that refers to software objects. The term "network server machine" refers to a host computer that includes a network server, and the term "network client machine" refers to a host computer that includes a network client. The term "document server" refers to an apparatus that provides downloadable documents, and the term "code server" refers to an apparatus that provides downloadable code.

The CORBA

The interoperability of software objects between object-oriented clients and servers has become a significant issue in distributed computing systems. Typically, since different (object-oriented) client/servers have different object interfaces, objects produced by one client/server cannot be used by another client/server. One present effort for standardizing an interface for objects within (object-oriented) client/servers is known as Common Object Request Broker Architecture (CORBA).

The CORBA specification generally provides interfaces by which a client/server can access software objects from another client/server and also provide access to its own software objects to other client/servers. To enable the accessing of such "distributed objects", CORBA specifies an "Interface Definition Language" (IDL) to be used by the client/server, more particularly to be used by object request brokers (ORBs) within each client/server. Exemplary client/servers incorporating IDL include SunOS™ and NEO™ from Sun Microsystems, Inc. and DCE and ORBIX from Digital Equipment Corporation.

Further information regarding CORBA can be found in the following references: "The Common Object Request Broker: Architecture and Specification", Release 2.0, Published by Object Management Group (OMG), Framingham, Mass. July 1995. "The ESSENTIAL CORBA: System Integration Using Distributed Objects" Thomas J. Mowbray, PhD and Ron Zahavi. Published by John Wiley and Object Management Group. 1995.

Although IDL has provided a standardized way of defining object interfaces, CORBA did not specify an "on-the-wire-protocol" for the access of objects across a network. As a result, different vendors have implemented ORBs using different network protocols and different data formats for handling such network objects.

The Java™ Language

With the increasing popularity of the Internet and the World-Wide Web, interoperability of software between completely different computers and operating systems has become an issue. One problem with obtaining software from the Internet is that when a user receives a document from a document server, the user should also obtain an operating system specific driver for the document. With conventional network hypertext mark-up language (HTML) browsers, for example, "helper applications" should be provided, such as movie viewers, sound players, etc. in order to "use" the document. A solution that was developed to overcome this problem is the Java language, developed by Sun Microsystems, Inc.

The Java language is an object-oriented language that can be integrated into conventional HTML browsers and allows a document server to provide the browser with documents as well as executable code. The executable code is automatically loaded from the document server if the HTML browser determines that it does not have the appropriate driver already resident on the user machine. The executable code takes the form of application programs, "applets", comprising "bytecodes" that are machine independent. These applets are then interpreted by operating system specific applet interpreters (virtual machines). A current Internet/Web browser implementation using the Java language is HotJava™, also developed by Sun Microsystems, Inc.

Further information regarding the Java Language and the HotJava browser can be found in the following references: "The Java/HotJava Programmer's Guide" currently posted at the following Internet site: http://java.sun.com/proGuide/index.html, and "The Java Language Specification" Release 1.0 Alpha3, May 11, 1995 attached as Appendix A.

SUMMARY OF THE INVENTION

The present invention provides methods and apparatus for allowing application programs to invoke objects within network servers that have different network (on-the-wire) protocols. In particular, the present invention allows document servers to down-load ORBs and network protocols to application programs, thus enabling application programs to invoke objects within network servers.

According to a preferred embodiment, a method for enabling an application program to communicate with a network server, includes the steps of downloading a document from a document server to the application program, downloading code from a code server associated with the document server to the application program, the code including a network protocol handler for the network server, and using the network protocol handler to communicate with the network server.

According to another preferred embodiment, a distributed computing system including a network server also includes a document server for storing a plurality of documents, a code server for storing a plurality of code associated with the plurality of documents, the plurality of code including a network protocol handler, and an application program for loading a document from the plurality of documents, for loading code from the plurality of code associated with the document, and for using the network protocol handler within the code to communicate with the network server.

The present invention also provides methods and apparatus for enabling application programs to receive communications from network clients that have different network (on-the-wire) protocols. In particular, the present invention allows document servers to down-load ORBs and network protocols to application programs, thus enabling network clients to invoke objects in application programs.

According to another preferred embodiment, a method for enabling an application program to receive communications from a network client includes the steps of downloading a document from a document server to the application program, downloading code from a code server associated with the document server to the application program, the code including a network protocol handler for the network client, and using the network protocol handler to receive communications from the network client.

According to yet another preferred embodiment a distributed computing system including a network client also includes a document server for storing a plurality of documents, a code server for storing a plurality of code associated with the plurality of documents, the plurality of code including a network protocol handler, and an application program for loading a document from the plurality of documents, for loading code from the plurality of code associated with the document, and for using the network protocol handler within the code to receive communications from the network client.

BRIEF DESCRIPTION OF THE DRAWINGS

FIG. 14 is an example of a potential end user application incorporating the preferred embodiment of the present invention; and Appendix A includes "The Java Language Specification," Release 1.0 alpha3, May 11, 1995.

DESCRIPTION OF THE PREFERRED EMBODIMENT

Figure 1:
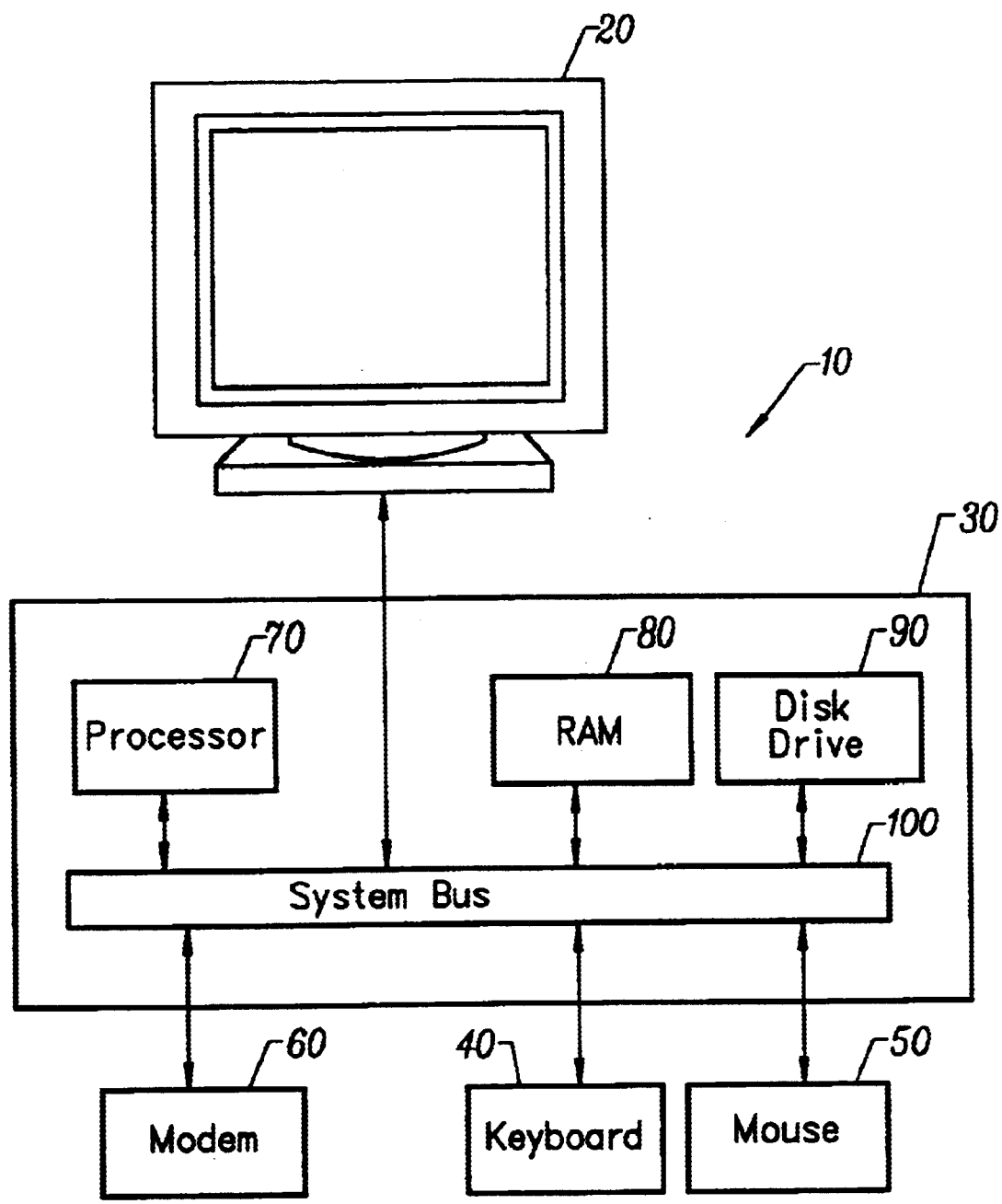
FIG. 1 is a block diagram of a system according to a preferred embodiment of the present invention.

FIG. 1 is a block diagram of a system 10 according to a preferred embodiment of the present invention. System 10 includes a display monitor 20, a computer 30, a keyboard 40, a mouse 50, and a modem 60. Computer 30 includes familiar computer components such as a processor 70, memory storage devices such as a random access memory (RAM) 80 and a disk drive 90, and a system bus 100, interconnecting the above components. Mouse 50 is but one example of a graphical input device, a trackball is an example of another. Modem 60 is but one example of a device enabling system 10 to be coupled to a network, a network interface card is another. RAM 80, disk drive 90 are examples of tangible media for storage of computer programs, other types of tangible media include floppy disks, removable hard disks, optical storage media such as CD-ROMS and bar codes, and semiconductor memories such as flash memory and read-only-memories (ROMS).

In a preferred embodiment, system 10 includes a SPARCStation™ 10 computer from Sun Microsystems, Inc., running the Solaris™ operating system and HotJava software from Sun Microsystems, Inc.

FIG. 1 is representative of but one type of system for embodying the present invention. It will be readily apparent to one of ordinary skill in the art that many system types and configurations are suitable for use in conjunction with the present invention, such as WindowsNT® or Windows95® from Microsoft Corporation on a IBM-PC compatible computer.

Figure 2:
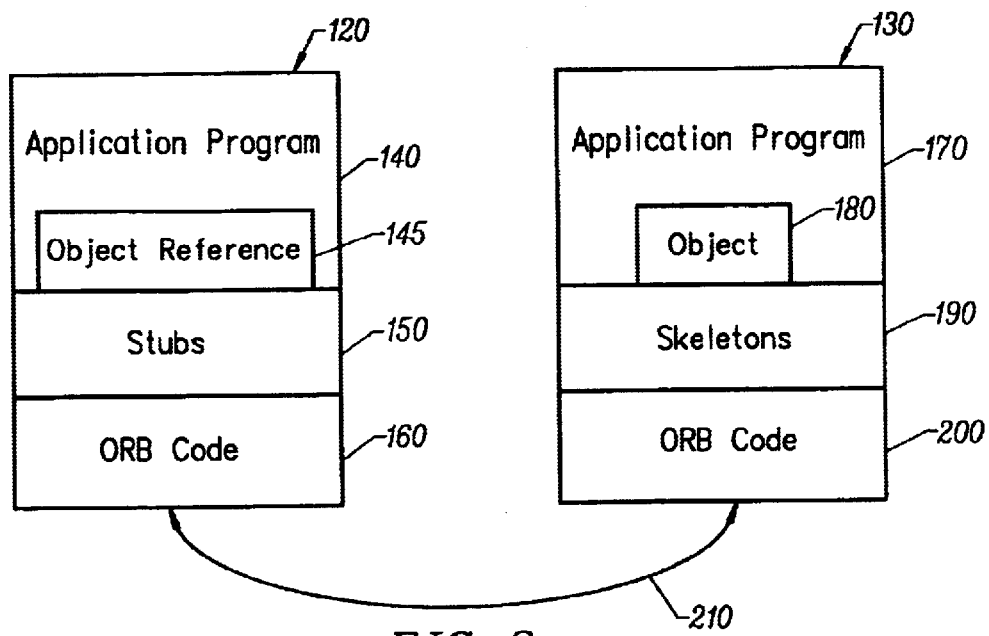
FIG. 2 is a block diagram of the process of an application program invoking a method on an object in a network server.

FIG. 2 is a block diagram of the process of an application program invoking a method on an object in a network server. FIG. 2 includes a network client 120 and a network server 130. Network client 120 includes an application program 140, object reference 145, 14
network client stubs (stubs) 150, and ORB specific code 160. Network server 130 includes a application program 170 including an object 180, network server stubs (skeletons) 190, and ORB specific code 200. Path 210 provides communication between network client 120 and network server 130.

In a typical distributed computing system, application program 140 is an object-oriented application running under a commercial operating system such as Solaris, and application program 170 is also an object-oriented application running under a commercial operating system such as Solaris.

Network client stubs (stubs) 150 are known to application program 140 and serve to receive requests from application program 140. These requests typically include calling methods provided by object 180. Based upon the requests from application program 140, stubs 150 serve to "marshal" data appropriate to the request. Marshaling will be further described in conjunction with FIG. 3.

In order to ensure network client 120 and network server 130 can communicate with each other, each side's ORB specific codes 160 and 200 is preferred to be IDL compliant. Further, when network client 120 and network server 130 communicate across a network, such as path 210, each side should ensure that ORB specific codes 160 and 200 both can transmit data using a network protocol supported by the other side.

In operation, when application program 140 attempts to invoke a method of object 180, application program 140 invokes stubs 150. Stubs 150 marshal the appropriate data for the method invocation and the ORB specific code 160 transmits the data to ORB specific code 200. As will be described in conjunction with FIG. 3, ORB specific code 160 includes a network protocol handler specifically for communicating with ORB specific code 200 across path 210.

Once ORB specific code 200 receives the data, network server stubs (skeletons) 190 "un-marshal" the data, and provides the method request to application program 170. In response, application program 170 invokes the requested method on object 180. Any resulting data from object 180 is transferred back to network client 120 in a process similar to that described above.

I. Application Program as a Network Client

Figure 3:
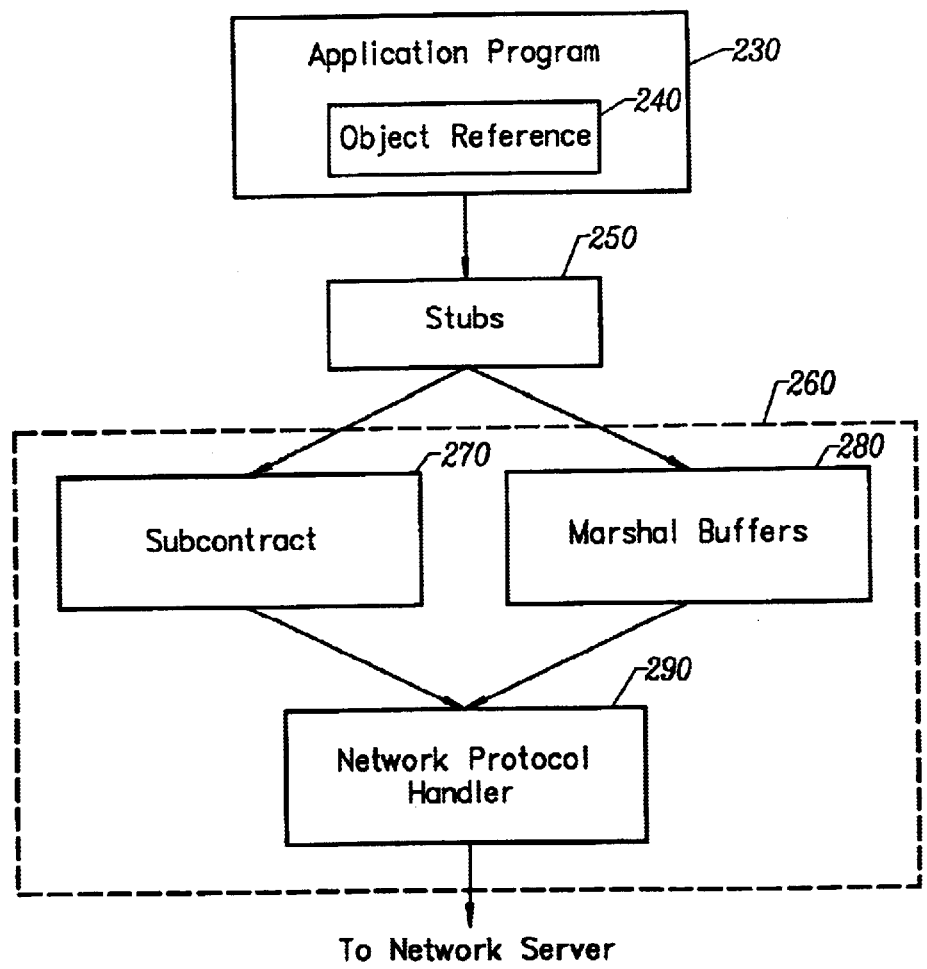
FIG. 3 is a more detailed block diagram of a network client illustrated FIG. 2.

FIG. 3 is a more detailed block diagram of a network client illustrated FIG. 2. FIG. 3 includes application program 230 including an object reference 240, stubs 250, and ORB specific code 260. ORB specific code 260 includes subcontracts 270, marshal buffers 280, and network protocol handlers 290.

Briefly, stubs 250 are used to marshal arguments from application program 230 into marshal buffers 280, call subcontracts 270 to execute remote calls, and to unmarshal any results from a network server. Subcontracts 270 call network protocol handlers 290 which in turn formats the data in the network protocol understood by the network server.

Further information regarding typical remote procedure calls in an object-oriented system can be found in the following references: A. D. Birrell and B. J. Nelson, "Implementing Remote Procedure Calls," ACM Trans. on Computer Systems, 2(1), February 1984; and B. J. Nelson, "Remote Procedure Call," Tech report CSL-81-9, Xerox Palo Alto Research Center, Palo Alto, Calif., 1981.

As illustrated in FIGS. 2 and 3, in order to communicate from an application program to a server application, the application program should know, a priori, quite a bit about the server application and network server. For example, the application program should know about they types of objects available on the network server, the application program should know whether the network server is IDL compliant, and the application program should be made aware of the appropriate network protocol of the network server.

Figure 4:
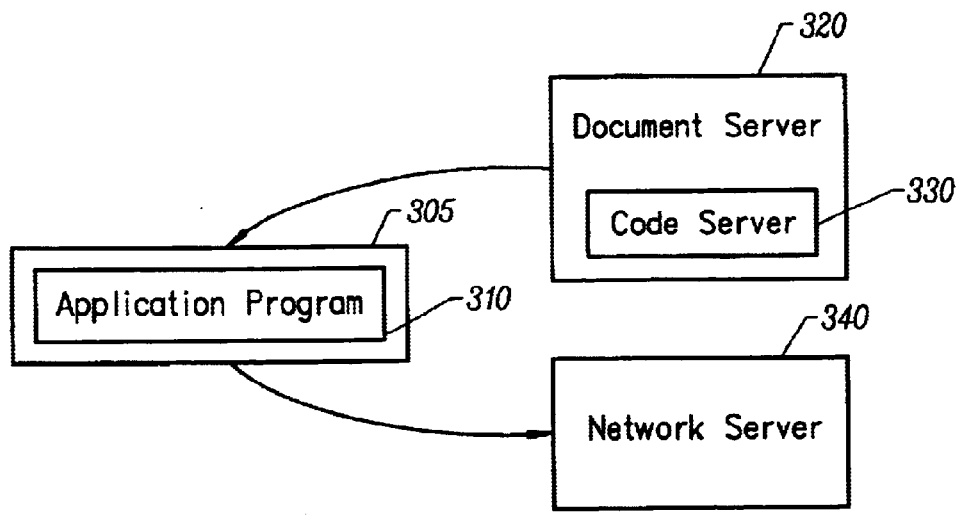
FIG. 4 is a graphic representation of a preferred embodiment of the present invention.

FIG. 4 is a graphic representation of a preferred embodiment of the present invention. FIG. 4 includes a client machine 305 including an application program 310, a document server 320, a code server 330, and a network server 340.

In the preferred embodiment, an application program 310, may or may not be an object-oriented application program. For example, application program 310 may be an Internet document browser such as HotJava or Netscape Navigator® from Netscape Communications, both which support the Java language. Initially, application program 310 typically is unaware of the network protocol necessary to communicate with network server 340.

Application program 310 is typically couplable and uncouplable with multiple document servers, as illustrated by document server 320. In a preferred embodiment, document server 320 includes code server 330, however alternatively, document server 320 and code server 330 may reside at different address spaces, e.g. on different physical machines. Document server 320 typically downloads documents to application program 310, and code server 330 typically downloads code to application program 310, in response to requests from document server 320. In the preferred embodiment of the present invention, code server 330 downloads Java Language bytecodes which form application programs (applets). When application program 310 executes the applets downloaded from code server 330, application program 310 is given the information necessary to communicate with network server 340.

Figure 5:
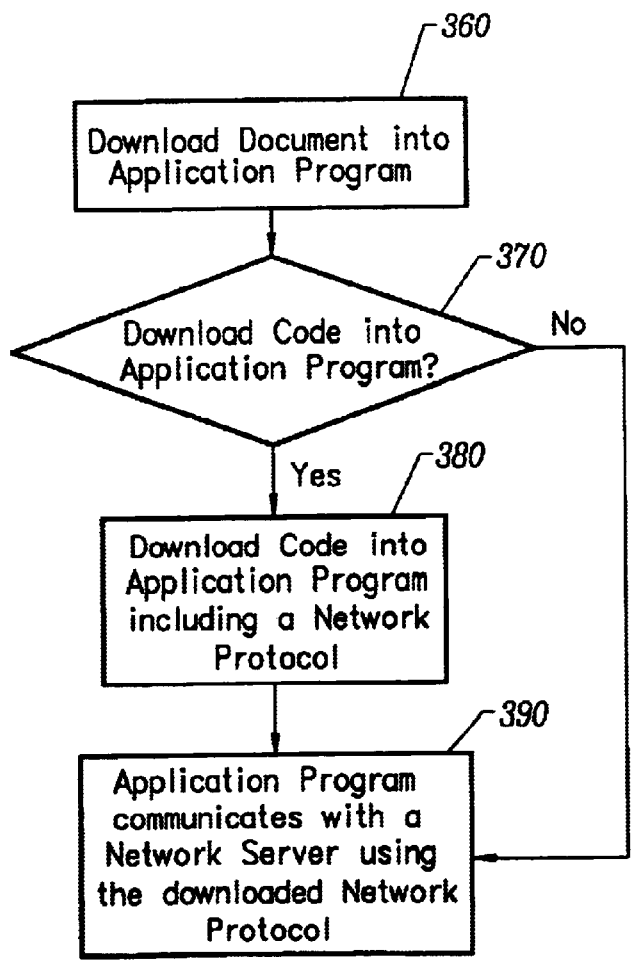
FIG. 5 is a flow diagram of a preferred embodiment of the present invention.

FIG. 5 is a flow diagram of a preferred embodiment of the present invention.

In the preferred embodiment, initially a document server downloads a document to an application program, step 360. For example, the document can be a page of text and graphics. Typically the document will include a plurality of actions the application program may take next, such as downloading another document, as is well known. In the present embodiment, one action the application program may take is to invoke a method on an object within a network server.

Next, typically in response to a user selection on the displayed document, the document server may determine that code, in the form of applets, should be downloaded to the application program, step 370. Alternatively, this step may be skipped entirely, and the process flow continue from step 360 to step 380.

In step 380, code is downloaded from the code server to the application program. As mentioned above, step 370 may be skipped if the document server assumes that typical application programs do not already have the code preloaded on the client machine.

In step 390, the application program executes the downloaded code, and in response, the application program communicates with a particular network server using the appropriate network protocol for that network server. Typically, this communication includes invoking a method of an object resident on the network server.

Note that the application program may not have any network protocol, or have a default network protocol that is different from the network protocol of the network server. In either case, the application program should receive the appropriate network protocol for the network server from the document server.

Figure 6:
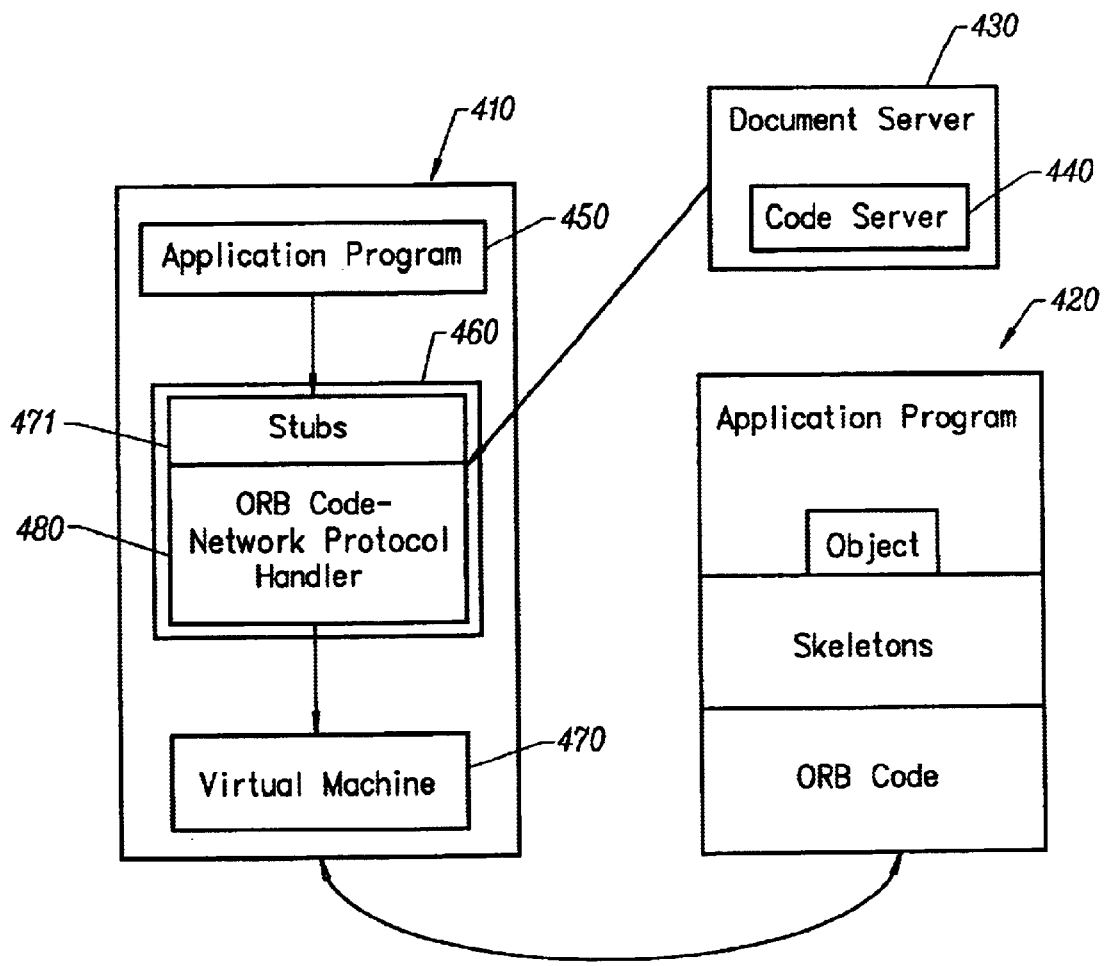
FIG. 6 is a more detailed graphic representation of a preferred embodiment of the present invention.

FIG. 6 is a more detailed graphic representation of a preferred embodiment of the present invention. FIG. 6 includes a network Client 410, a network server 420, a document server 430, and a code server 440. Network client 410 includes an application program 450, downloaded code 460, and a virtual machine 470. Downloaded code 460 includes stubs 471 and other ORB specific code 480, in particular, a network protocol handler.

As illustrated, initially if application program 450 desires to communicate with an application program on network server 420, application program 450 is unaware of how to do so. However, alter downloaded code 460 is executed by application program 450, application program 450 then has the tools necessary to communicate with network server 420. In one particular embodiment, stubs 471 and ORB specific code 480.

In the preferred embodiment of the present invention, virtual machine 470 is provided to emphasize that downloaded code 460 comprise Java Language bytecodes. In the preferred embodiment, downloaded code 460 is initially written as IDL compliant ORB code, this code is then compiled to become Java Language bytecodes. Because Java Language bytecodes are machine independent, virtual machines, such as virtual machine 470, are created for different network client 410 host machines to interpret the bytecodes.

Figure 7:
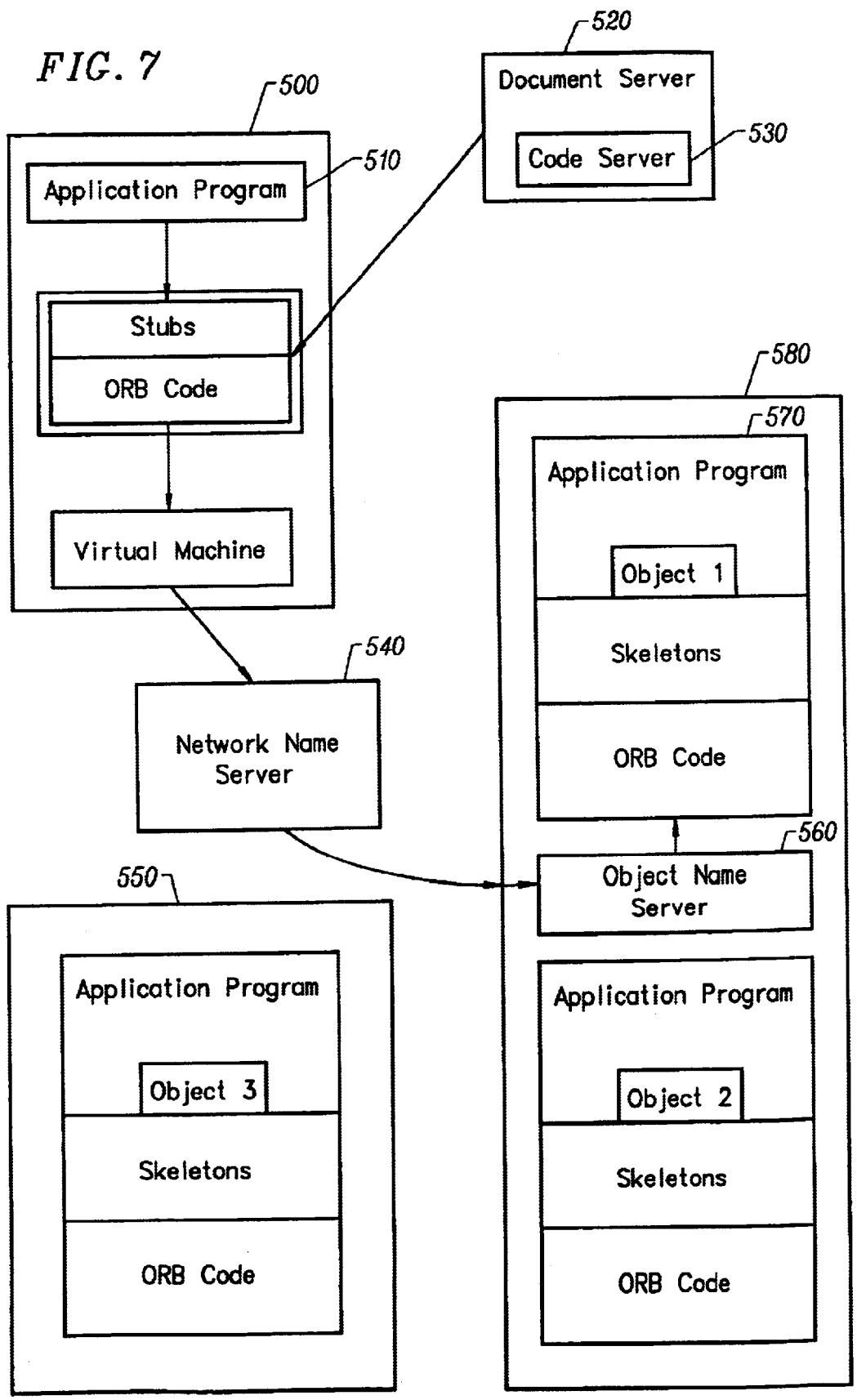
FIG. 7 is a graphic representation of the concepts of a network name server and an object name server.

FIG. 7 is a graphic representation of the concepts of a network name server and an object name server. FIG. 7 includes a client machine 500 including an application program 510, a document server 520, a code server 530, a network name server 540, network server machines 550 and 580, an object name server 560 and a network server 570.

Network name servers such as network name server 540, are servers that return a machine address for a network server in response to an inputted network server name. Such network name servers are well known in the art. Object name servers such as object name server 530, are servers that are resident in network server machines. Object name servers return references to network servers in response to an inputted object name. Such object name servers are also well known in the art.

In operation, as described in conjunction with FIG. 4, code server 520 downloads applets that enable application program 510 to communicate with network server 570. Application program 510, however may only be given the logical name for the network server. Thus, in order to find the network server machine within which network server 570 resides, application program 510 refers to network name server 540 to find the network server machine address.

As illustrated in FIG. 7, once application program 510 has located network server machine 550, application program 510 typically refers to object name server 560 to find a reference to network server 570. It is noted that document server 520, code server 530, and network server 570 may reside within the same physical machine, may share the same address space, or document server 520 may know beforehand the network server machine address of the network server, thus in such cases, a network name server is not needed.

Figure 8:
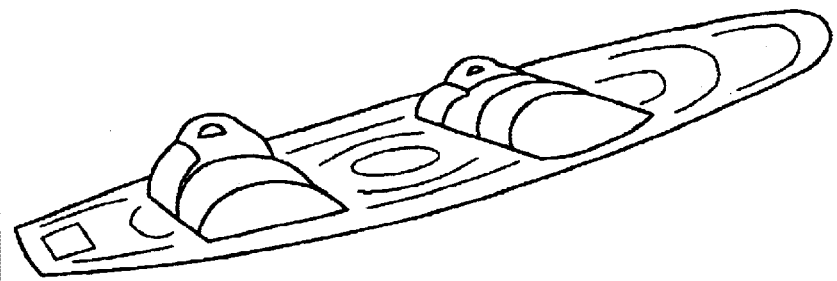
FIG. 8 is an example of a potential end user application incorporating the preferred embodiment of the present invention.

FIG. 8 is an example of a potential end user application incorporating the preferred embodiment of the present invention. FIG. 8 includes a display of a document on a web browser and a plurality of buttons, such as button 590.

In FIG. 8, the application program illustrated is an Internet browser, such as HotJava. The application program has connected to a document server having the address "file://localhost/export/JOE/goodbuys.html" and the document is displayed to the user as shown in FIG. 8. The document illustrates a page in an on-line catalog where a user can place orders for goods. Unbeknownst to the application program, the on-line ordering system is an object-oriented network server having a particular network protocol.

When the user wishes to place an order for the item, the user selects button 590. The application program transmits the user's selection of button 590 to the document server, and in response, the document server has an associated code server download Java Language applets to the application program. After the applets have been downloaded, the application program executes the applets. These applets contain object stubs, ORB specific code including the particular network protocol of the on-line ordering system, a network name of the on-line ordering system, etc. The application program then connects to the on-line ordering system, and upon connection therewith, invokes an object within the online ordering system. Typically the on-line ordering system returns an acknowledgement signal which is passed back to the application program.

II. Application Program as a Network Server

Figure 9:
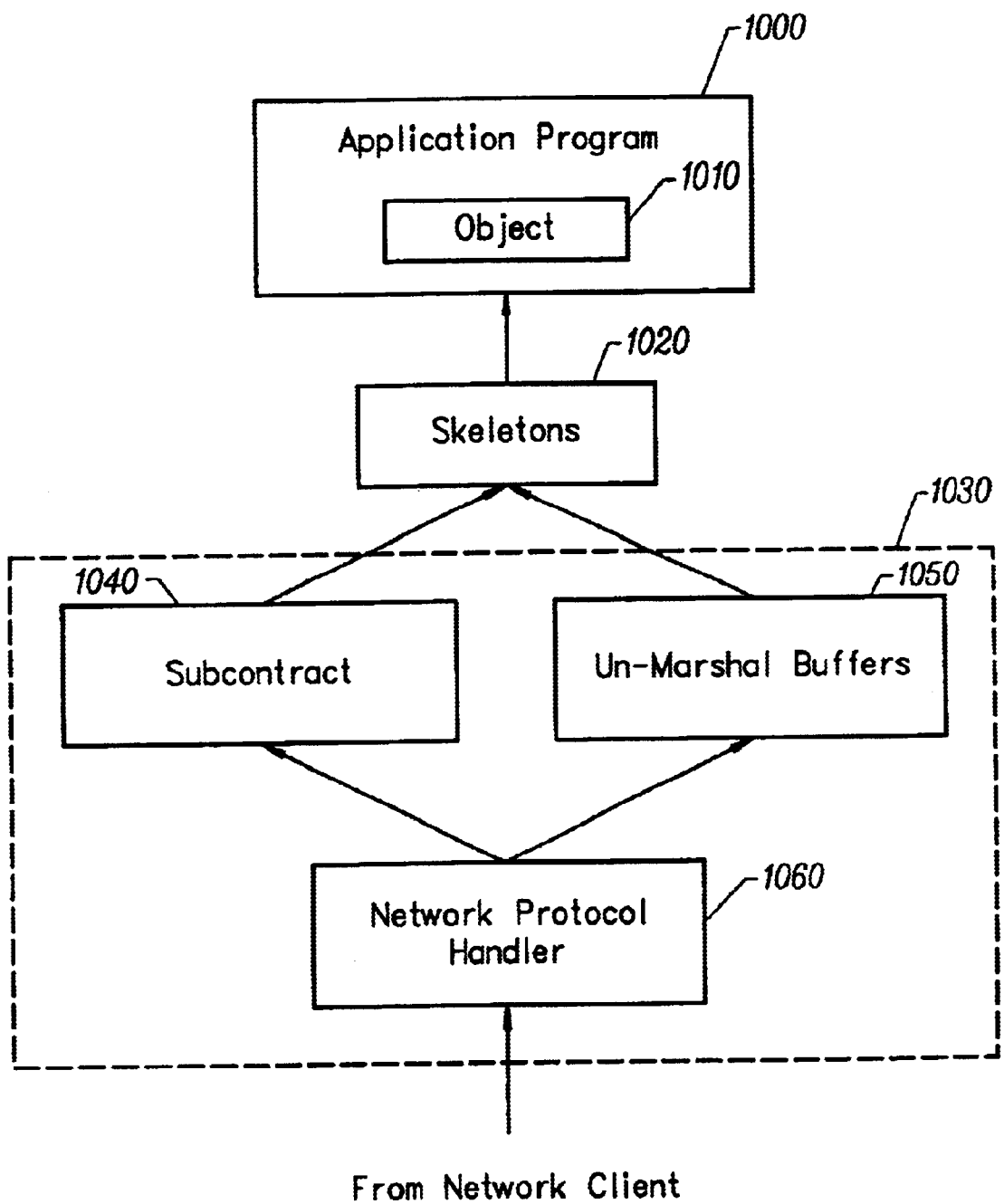
FIG. 9 is a more detailed block diagram of a network server illustrated FIG. 2.

FIG. 9 is a more detailed block diagram of a network server illustrated FIG. 2. FIG. 9 includes application program 1000 including an object 1010, skeletons 1020, and ORB specific code 1030. ORB specific code 1030 includes subcontracts 1040, marshal buffers 1050, and network protocol handlers 1060.

Network protocol handlers 1060 receive data from a network client and uses subcontracts 1040 to place data into marshal buffers 1050. Skeletons 1020 are then used to unmarshal the arguments to a form that application program 1000 understands. Application program 1000 then invokes a method on object 1010.

Further information regarding typical remote procedure calls in an object-oriented system can also be found in the references: A. D. Birrell and B. J. Nelson, "Implementing Remote Procedure Calls," ACM Trans. on Computer Systems, 2(1), February 1984; and B. J. Nelson, "Remote Procedure Call," Tech report CSL-81-9, Xerox Palo Alto Research Center, Palo Alto, Calif., 1981.

As illustrated in FIGS. 2 and 9, in order for an application program to provide an object to a network client, the application program should know, a priori, how to support objects. For example, the application program should know what objects are going to be accessed from the client server, the application program should support the IDL specification, and the application program should have a network protocol which is known by network client.

Figure 10:
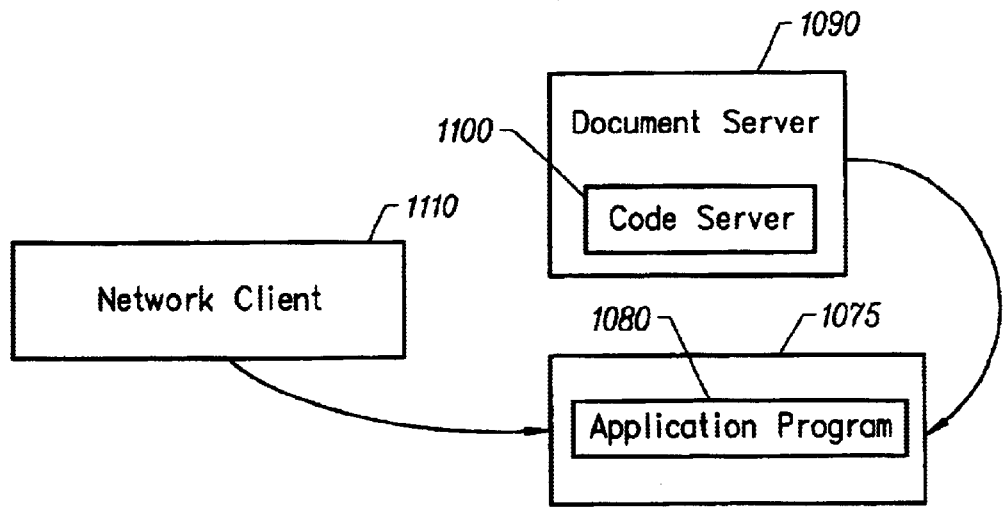
FIG. 10 is a graphic representation of a preferred embodiment of the present invention.

FIG. 10 is a graphic representation of a preferred embodiment of the present invention. FIG. 10 includes a network server machine 1075 including an application program 1080, a document server 1090, a code server 1100, and a network client 1110.

In the preferred embodiment, a application program 1080, may or may not be an object-oriented application program. For example, application program 1080 may be an Internet document browser such as HotJava or Navigator, both which support the Java language. Initially, application program 1080 typically is unaware of how to support network objects and the network protocol necessary to receive communications from network client 1110.

Application program 1080 is typically couplable and uncouplable with multiple document servers, as illustrated by document server 1090. In a preferred embodiment, document server 1090 includes code server 1100, however alternatively, document server 1090 and code server 1100 may reside at different address spaces, e.g. on different physical machines. Document server 1090 typically downloads documents to application program 1080, and code server 1100 typically downloads code to application program 1080, in response to requests from document server 1090. In the preferred embodiment of the present invention, code server 1100 downloads Java Language bytecodes which form application programs (applets), as was described in Section I. When application program 1080 executes the applets downloaded from code server 1100, application program 1080 is given the information necessary to support network objects and methods requested by network client 1110.

Figure 11:
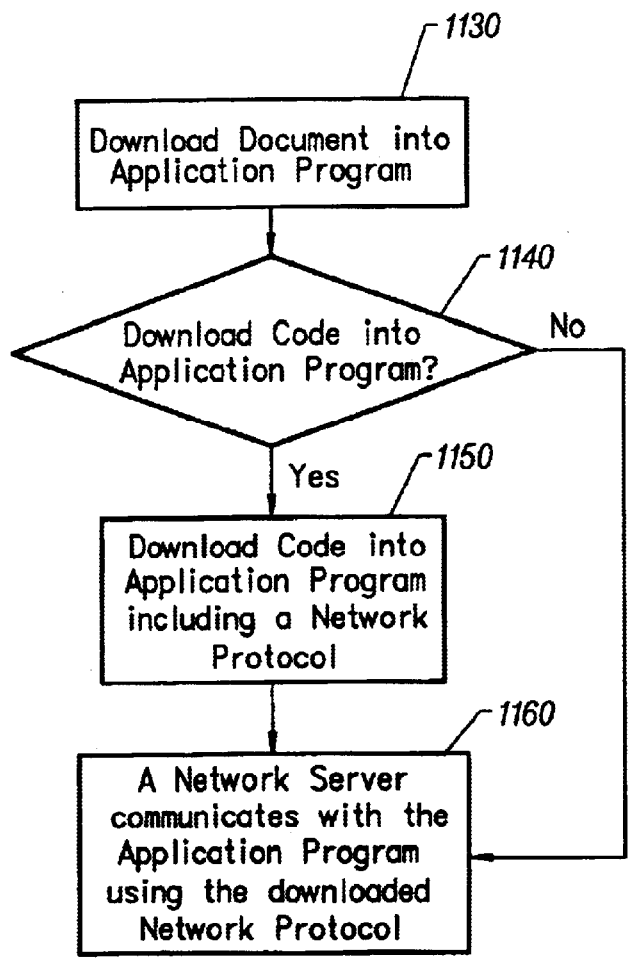
FIG. 11 is a flow diagram of a preferred embodiment of the present invention.

FIG. 11 is a flow diagram of a preferred embodiment of the present invention.

In the preferred embodiment, initially a document server downloads a document to an application program, step 1130. For example, the document can be a page of text and graphics. Typically the document will include a plurality of actions the application program may take next, such as downloading another document as is well known. In the present embodiment, one action the application program may take is to create and support a network object.

Next, typically in response to a user selection on the displayed document, the document server may determine that code, in the form of applets, should be downloaded to the application program, step 1140. Alternatively, this step may be skipped entirely, and the process flow continue from step 1130 to step 1150.

In step 1150, code is downloaded from the code server to the application program. As mentioned above, step 1140 may be skipped if the document server assumes that typical application programs do not already have the code preloaded on the server machine.

In step 1160, the application program executes the downloaded code, and in response, the application program is given the ability to support a network object. Network clients can thus communicate with the application program and invoke methods of the object resident on the application program.

Figure 12:
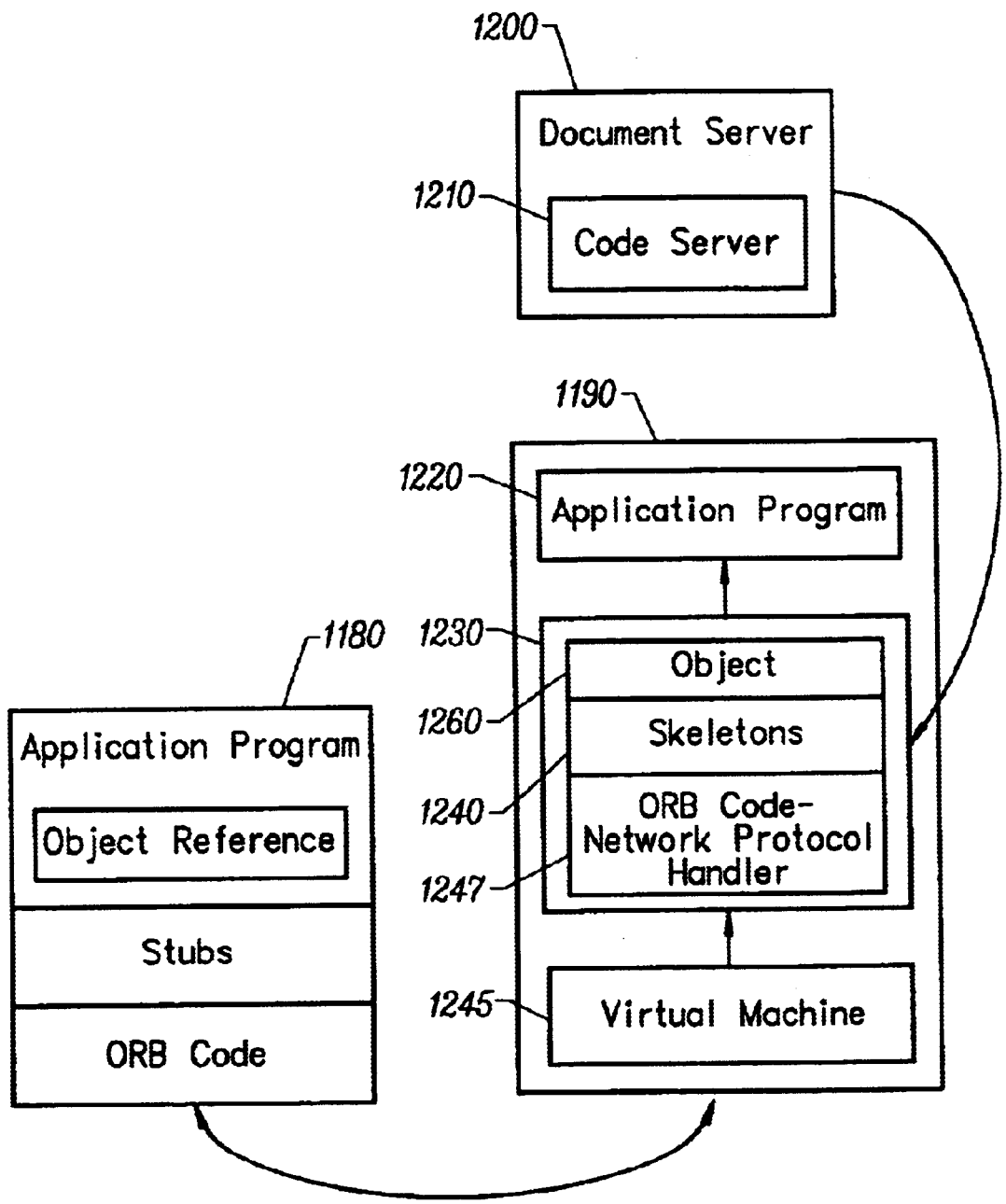
FIG. 12 is a more detailed graphic representation of a preferred embodiment of the present invention.

FIG. 12 is a more detailed graphic representation of a preferred embodiment of the present invention. FIG. 12 includes a network client 1180, a network server 1190, a document server 1200, and a code server 1210. Network server 1190 includes an application program 1220, downloaded code 1230, and a virtual machine 1245. Downloaded code 1230 includes skeletons 1240, other ORB specific code 1247, and an object 1260.

As illustrated, initially application program 1220 cannot receive communications from an application program on network client 1180, since application program 1220 does not have the tools to support an object call. However, after downloaded code 1230 is executed by application program 1220 server application then has the tools necessary to support an object call from network client 1180. In a particular embodiment, skeletons 1240, ORB specific code 1247 and object 1260.

In the preferred embodiment of the present invention, virtual machine 1240 is provided on the network server to emphasize that downloaded code 1230 comprise Java Language bytecodes. In the preferred embodiment, downloaded code 1230 is initially written as IDL compliant ORB code, this code is then compiled to become Java Language bytecodes. Because Java Language bytecodes are machine independent, virtual machines, such as virtual machine 1240, are created for different network server 1190 host machines to interpret the bytecodes.

Figure 13:
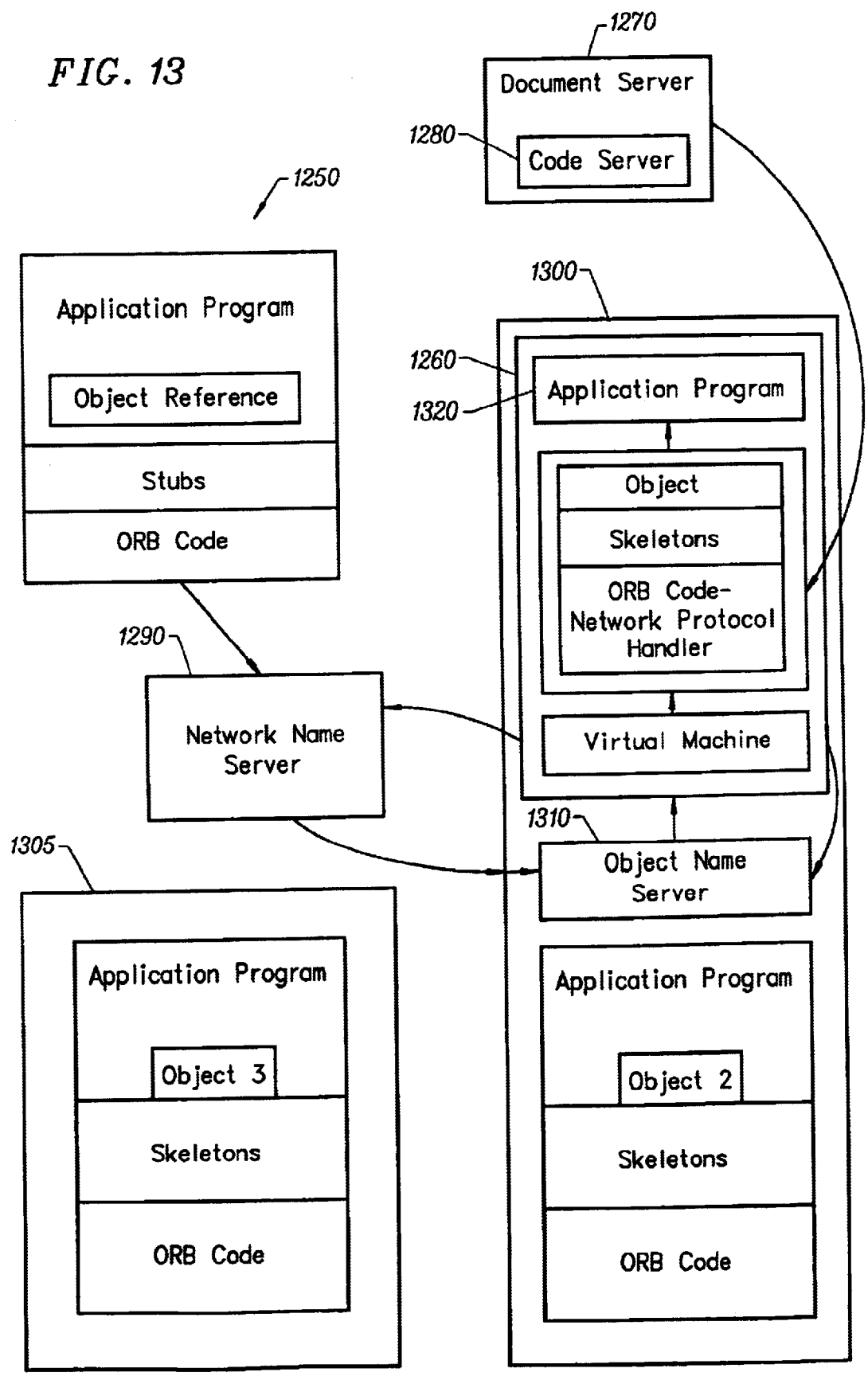
FIG. 13 is a graphic representation of the concepts of a network name server and an object name server.

FIG. 13 is a graphic representation of the concepts of a network name server and an object name server. FIG. 13 includes a network client 1250, a document server 1270, a code server 1280, a network name server 1290, network server machine 1300 and 1305, an object name server 1310, a network server 1260, and an application program 1320.

Network name servers such as network name server 1290, are servers that return a machine address for a network server in response to an inputted server name. Such network name servers are well known in the art. Object name servers such as object name server 1310, are servers that are resident in network server machines. Object name servers return references to network object servers in response to an inputted object name. Such object name servers are also well known in the art.

In operation, as described in conjunction with FIG. 11, code server 1280 downloads applets that enable application program 1320 to receive communications from network client 1250. Network client 1250, however may only be given the logical name for the network server 1260. Thus, in order to enable network client 1250 to find the network server machine within which network server 1260 resides, using the downloaded code, application program 1320 first "publishes" the object name and the network server machine address in network name server 1290.

As illustrated in FIG. 11, once network client 1250 has located network server machine 1300, network client 1250 typically refers to object name server 1310 to find a reference to network server 1260. Again, using the downloaded code, application program 1320 first "publishes" the object name and provides a pointer to the network server 1260.

It is noted that document server 1270 and code server 1280 may reside within the same physical machine.

FIG. 14 is an example of a potential end user application incorporating the preferred embodiment of the present invention. FIG. 14 includes a display of a document on a web browser and a plurality of buttons, such as button 1340.

In FIG. 14, the application program illustrated is an Internet browser, such as HotJava. The application program has connected to a document server having the address as shown in the Netsite text entry are area and the document is displayed to the user as shown in FIG. 14. The document illustrates an order display page in a brokerage trading system where the user can place orders for a stock. Unbeknownst to the application program, the brokerage trading system is an object-oriented network client/server.

When the user wishes to place an order for a stock at a certain price, the user selects button 1340. The server application transmits the users selection of button 1340 to the document server, and in response, the document server has an associated code server download Java language applets to the application program. After the applets have been downloaded, the application program executes the applets. These applets contain object skeletons, ORB specific code including the particular network protocol of the brokerage trading system, etc. In response to a trade command, for example, the application program creates an "trade" object. The user may then exit the web browser. Later, when the trade has executed, the brokerage trading system calls up the user's machine and invokes a method on the "trade" object in the application program to notify the user that the trade is complete.

Conclusion

In the foregoing specification, the invention has been described with reference to specific exemplary embodiments thereof. Many changes or modifications are readily envisioned. For example, the application programs may be object-oriented or programmed in C++; the code that is downloaded may be machine dependent or specific; the code that is downloaded may only contain the network protocol for the network server; the code that is downloaded may only contain the network protocol for the network client; the document server, code server, and the network server may be located at the same address space or in the same physical computer; the document server, code server, and the network client may be located at the same address space or in the same physical computer; etc.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed:

1. A method for enabling a client computer to communicate with a network server computer comprises:

downloading a web page specified by a web server into a web browser in the client computer;

downloading computer code associated with the web page and specified by a server process associated with the web server, wherein when the computer code is executed from within the web browser, it implements a network protocol compatible with a network protocol of the network server computer; and using the network protocol to transmit data to the network server computer.

2. The method of claim 1 wherein a web server computer includes the server process and the web server.

3. A The method of claim 1 wherein the server process and the web server reside on different computers.

4. The method of claim 1 wherein the computer code comprises at least one applet.

5. The method of claim 4 wherein the applet is interpreted.

6. The method of claim 1 wherein the computer code comprises code that is configured to be executed on a plurality of different computer platforms.

7. The method of claim 1 wherein the computer code also comprises code associated with an object request broker.

8. The method of claim 1 further comprising receiving return data from the network server computer using the network protocol.

9. The method of claim 1 wherein the data comprises data configured to request invocation of a method of an object on the network server computer.

10. The method of claim 1 wherein the web server and the server process reside on the network server computer.

11. A graphical user interface for a computer system including a display comprises:

a first portion of a web browser configured to display a plurality of web navigation icons; and a second portion of a web browser configured to display a web page including textual data and at least one icon that is user-selectable, wherein the one icon is associated with computer code, wherein the web page and the computer code are downloaded into the computer system, and wherein when the computer code is executed from within the web browser, it implements a network protocol;

wherein data is transmitted to a network server using the network protocol specified by the computer code in response to the one icon being selected.

12. The graphical user interface of claim 11 wherein the web page is provided by a web server.

13. The graphical user interface of claim 12 wherein the computer code is provided by the web server.

14. The graphical user interface of claim 11 wherein a web server and a network server reside within one computer system.

15. The graphical user interface of claim 11 wherein the computer code comprises at least one applet.

16. The graphical user interface of claim 15 wherein the computer code is interpreted.

17. The graphical user interface of claim 15 wherein the second portion is also configured to display return data from the network server, the return data provided to the computer system using the network protocol.

18. The graphical user interface of claim 11 wherein the computer code is compiled code.

19. The graphical user interface of claim 11 wherein the computer code comprises machine independent computer code.

20. The graphical user interface of claim 11 wherein the data comprise data associated with a method call of an object on the network server.

21. A method for enabling a client computer to communicate with a network server computer comprises:

providing a web page specified by a web server to a web browser environment within the client computer;

providing computer code specified by a server process associated with the web server to the client computer, wherein when the computer code is executed from within the web browser environment, it implements a network protocol compatible with a network protocol of the network server computer; and receiving data using the network protocol from the client computer for the network server computer.

22. The method of claim 21 wherein the network server computer includes the web server and the server process.

23. The method of claim 21 wherein the computer code comprises at least one applet.

24. The method of claim 23 wherein the applet comprises compiled code.

25. The method of claim 21 wherein the computer code comprises code that is configured to be executed on a plurality of different computer platforms.

26. The method of claim 21 wherein the data comprises data configured to request invocation of a method of an object on the network server computer.

27. The method of claim 26 further comprising invoking the method of the object on the network server computer.

28. The method of claim 27 further comprising providing return data to the client computer using the network protocol.

29. The method of claim 26 wherein the computer code is also configured to provide a stub for the object.

30. The method of claim 26 further comprising un-marshaling the data in the network server computer.

31. A method for enabling a client computer to receive communications from a network server computer comprises:

downloading a web page specified by a web server into a web browser on the client computer;

downloading computer code specified by a server process associated with the web server, wherein when the computer code is executed within the web browser, it implements a network protocol compatible with a network protocol of the network server computer;

executing the computer code within the web browser; and receiving data from the network server computer using the network protocol.

32. The method of claim 31 wherein a web server computer includes the server process and the web server.

33. The method of claim 31 wherein the server process and the web server reside on different computers.

34. The method of claim 31 wherein the computer code comprises at least one applet.

35. The method of claim 31 wherein the computer code is interpreted.

36. The method of claim 31 wherein the computer code comprises code that is configured to be executed on a plurality of different computer platforms.

37. The method of claim 31 wherein the computer code also comprises code associated with an object request broker.

38. The method of claim 31 further comprising sending return data to the network server computer using the network protocol.

39. The method of claim 31 wherein the data comprises data configured to request invocation of a method of an object on the client computer.

40. The method of claim 31 wherein the web server and the server process reside on the network server computer.

41. A graphical user interface for a computer system including a display comprises:

a first portion of a web browser configured to display a plurality of web navigation icons; and providing computer code specified by a server process associated with a web server to the web browser on "a client computer", wherein when the computer code is executed within the web browser, it implements a network protocol compatible with a network protocol of "a network server computer;" and wherein data is received from a network server using the network protocol specified by the computer code in response to "an icon being selected."

42. The graphical user interface of claim 41 wherein the web page is provided by a web server.

43. The graphical user interface of claim 42 wherein the computer code is provided by the web server.

44. The graphical user interface of claim 41 wherein the web server and the network server reside within one computer system.

45. The graphical user interface of claim 41 wherein the computer code comprises at least one applet.

46. The graphical user interface of claim 45 wherein the computer code is interpreted.

47. The graphical user interface of claim 41 wherein the computer code is compiled code.

48. The graphical user interface of claim 41 wherein the computer code comprises machine independent computer code.

49. The graphical user interface of claim 41 wherein return data is provided to the network server using the network protocol.

50. The graphical user interface of claim 41 wherein the data comprise data associated with a method call of an object on the computer system.

51. A method for enabling a client computer to receive communications from a network server computer comprises:

providing a web page specified by a web server to a web browser environment on the client computer;

providing computer code specified by a server process associated with the web server to the client computer, wherein when the computer code is executed from within the web browser environment, it implements a network protocol compatible with a network protocol of the network server computer; and sending data from the network server computer to the client computer using the network protocol.

52. The method of claim 51 wherein the network server computer includes the web server and the server process.

53. The method of claim 51 wherein the computer code comprises at least one applet.

54. The method of claim 51 wherein the computer code comprises compiled code.

55. The method of claim 51 wherein the computer code comprises code that is configured to be executed on a plurality of different computer platforms.

56. The method of claim 51 wherein the data comprises data configured to request invocation of a method of an object on the client computer.

57. The method of claim 26 further comprising invoking the method of the object on the client computer.

58. The method of claim 57 further comprising receiving return data from the client computer using the network protocol.

59. The method of claim 56 wherein the computer code is also configured to provide a skeleton for the object.

60. The method of claim 56 further comprising un-marshaling the data in the client computer.

* * * * *